US012800798B2

(12) United States Patent
Hwang et al.

(10) Patent No.: US 12,800,798 B2

(45) Date of Patent: Nov. 17, 2026

(54) PROTECTIVE FILM, DISPLAY APPARATUS, AND METHOD OF MANUFACTURING DISPLAY APPARATUS

(71) Applicant: Samsung Display Co., Ltd., Yongin-si (KR)

(72) Inventors: Daehyun Hwang, Yongin-si (KR); Dohyung Ryu, Yongin-si (KR); Dongeun Lee, Yongin-si (KR); Wuhyeon Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 958 days.

(21) Appl. No.: 17/712,715

(22) Filed: Apr. 4, 2022

(65) Prior Publication Data

US 2023/0016706 A1 Jan. 19, 2023

(30) Foreign Application Priority Data

Jul. 7, 2021 (KR) ........................ 10-2021-0089260

(51) Int. Cl.
*G02B 1/14* (2015.01)

(52) U.S. Cl.
CPC ...................................... *G02B 1/14* (2015.01)

(58) Field of Classification Search
None
See application file for complete search history.

(56) References Cited

U.S. PATENT DOCUMENTS

| | | | | |
|---|---|---|---|---|
| 2016/0041436 A1* | 2/2016 | Igeta | G02F 1/1339 349/58 |
| 2017/0012026 A1* | 1/2017 | Choi | H10H 20/857 |
| 2017/0170151 A1 | 6/2017 | Rhee et al. | |
| 2020/0328382 A1* | 10/2020 | Lee | G02B 6/0051 |
| 2020/0388783 A1* | 12/2020 | Kang | H10K 59/8721 |

FOREIGN PATENT DOCUMENTS

| | | |
|---|---|---|
| CN | 111976249 | 11/2020 |
| CN | 112234152 | 1/2021 |
| KR | 10-2086579 | 4/2020 |
| KR | 10-2020-0120787 | 10/2020 |

* cited by examiner

*Primary Examiner* — Anthony J Frost
(74) *Attorney, Agent, or Firm* — F. CHAU & ASSOCIATES, LLC

(57) ABSTRACT

A protective film includes a first layer having a middle area, a first side area extended from a first edge of the middle area, a second side area extended from a second edge of the middle area intersecting the first edge of the middle area, and a corner area extending from the first side area and the second side area, and a second layer disposed on the first layer and exposing at least a portion of the corner area of the first layer.

20 Claims, 21 Drawing Sheets

PROTECTIVE FILM, DISPLAY APPARATUS, AND METHOD OF MANUFACTURING DISPLAY APPARATUS

CROSS-REFERENCE TO RELATED APPLICATION(S)

This application claims priority to and benefits of Korean Patent Application No. 10-2021-0089260 under 35 U.S.C. § 119, filed on Jul. 7, 2021 in the Korean Intellectual Property Office, the entire contents of which are incorporated herein by reference.

BACKGROUND

1. Technical Field

One or more embodiments relate to a projection film, a display apparatus, and a method of manufacturing the display apparatus.

2. Description of the Related Art

Electronic devices based on mobility have come into widespread use. Recently, tablet personal computers (PCs), in addition to small-sized electronic devices such as mobile phones, have been widely used as mobile electronic devices.

In order to support various functions, for example, to provide a user with visual information such as images or video, mobile electronic devices include a display. Recently, as components for driving such displays have become miniaturized, occupancy of the displays in electronic devices is gradually increasing. Moreover, a structure having two or more display areas each extending with an angle has been developed.

SUMMARY

One or more embodiments include a protective film having an improved elongation property, a display apparatus including the protective film, and a method of manufacturing the display apparatus.

Additional aspects will be set forth in the description which follows and, in part, will be apparent from the description, and/or may be learned by practice of the disclosed embodiments.

According to one or more embodiments, a protective film may include a first layer having a middle area, a first side area extending from a first edge of the middle area, a second side area extending from a second edge of the middle area intersecting the first edge of the middle area, and a corner area extending from the first side area and the second side area, and a second layer disposed on the first layer and exposing at least a portion of the corner area of the first layer.

The second layer may overlap the middle area, the first side area, and the second side area of the first layer, and the second layer may expose the corner area of the first layer.

The corner area may include a first area and a second area, the second layer may overlap the middle area, the first side area, the second side area, and the first area of the first layer in a plan view, and the second layer may expose the second area of the first layer.

The second area may be spaced apart from the first side area and the second side area, and the first area may surround at least a portion of the second area.

The first area may include a first line area and a second line area, the first line area may be disposed between the first side area and the second area, and the second line area may be disposed between the second side area and the second area.

The first area may include line areas each extending in a first direction and disposed in a second direction, the second area may include space areas each extending in the first direction and disposed in the second direction, and the line areas and the space areas may be disposed alternately in the second direction.

The corner area may have a sectoral shape in a plan view, the first direction may be a radial direction, and the second direction may be a circumferential direction.

A first width of each of the line areas in the second direction may increase in the first direction, and a second width of each of the space areas in the second direction may increase in the first direction.

The first layer may include a light-shielding layer, a cushioning layer, and another layer located between the light-shielding layer and the cushioning layer, and the another layer may include silicon or polyethylene terephthalate (PET).

The protective film may further include a third layer overlapping the at least a portion of the corner area exposed by the second layer in a plan view.

According to one or more embodiments, a display apparatus may include a protective film, a display panel, and a cover window. The protective film may include a first layer having a middle area and a corner area, the corner area extending from a corner of the middle area and being curved with a first radius of curvature, and a second layer disposed on a first surface of the first layer and exposing at least a portion of the corner area of the first layer. The display panel may be disposed on a second surface of the first layer opposite to the first surface of the first layer and may include a middle display area corresponding to the middle area and a corner display area corresponding to the corner area. A cover window may overlap the display panel in a plan view.

The second layer may overlap the middle area of the first layer in a plan view, and the second layer may expose the corner area of the first layer.

The corner area may include a first area and a second area, and the second layer may overlap the middle area and the first area of the first layer in a plan view, and the second layer may expose the second area of the first layer.

The first area may include line areas each extending in a first direction and disposed in a second direction, the second area may include space areas each extending in the first direction and disposed in the second direction, and the line areas and the space areas may be disposed alternately in the second direction.

The corner area may have a sectoral shape in plan view, the first direction may be a radial direction, and the second direction may be a circumferential direction.

The first layer may include a light-shielding layer, a cushioning layer, and another layer located between the light-shielding layer and the cushioning layer, and the another layer may include silicon or polyethylene terephthalate (PET).

The protective film may further include a third layer overlapping the at least a portion of the corner area exposed by the second layer in a plan view.

The first layer may further include a first side area extending from a first edge of the middle area and curved with a second radius of curvature, and a second side area extending from a second edge of the middle area intersecting the first edge of the middle area and curved with a third radius of curvature. The corner area may extend from the first side area and the second side area.

According to one or more embodiments, a method of manufacturing a display apparatus may include preparing a cover window, a display panel, and a protective film, arranging a first surface of the display panel to face the cover window, coupling the cover window with the display panel, arranging a first surface of the protective film to face a second surface of the display panel opposite to the first surface of the display panel, and coupling the display panel with the protective film. The protective film may include a first layer having a middle area, a first side area extending from a first edge of the middle area, a second side area extending from a second edge of the middle area intersecting the first edge of the middle area, and a corner area extending from the first side area and the second side area; and a second layer disposed on the first layer and exposing at least a portion of the corner area of the first layer.

The arranging of the first surface of the protective film to face the second surface of the display panel may include arranging the protective film and the display panel by using the at least a portion of the corner area exposed by the second layer as an alignment mark.

The arranging of the first surface of the protective film to face the second surface of the display panel may include arranging the protective film and the display panel by using the at least a portion of the corner area exposed by the second layer and an alignment mark displayed at a corner of the display panel.

The arranging of the first surface of the protective film to face the second surface of the display panel may include arranging the protective film and the display panel by using, as an alignment mark, a point where a virtual first line extending in a lengthwise direction of a first edge of the cover window intersects with a virtual second line extending in a lengthwise direction of a second edge of the cover window.

The second layer may overlap the middle area, the first side area, and the second side area of the first layer in a plan view, and the second layer may expose the corner area of the first layer.

The corner area may include a first area and a second area, and the second layer may overlap the middle area, the first side area, the second side area, and the first area of the first layer in a plan view, and the second layer may expose the second area of the first layer.

The first area may include line areas each extending in a first direction and disposed in a second direction, the second area may include space areas each extending in the first direction and disposed in the second direction, and the areas and the space areas may be disposed alternately in the second direction.

These and/or other aspects will become apparent and more readily appreciated from the following description of the embodiments, the claims, and the accompanying drawings.

These general and specific embodiments may be implemented by using a system, a method, a computer program, or a combination thereof.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1:
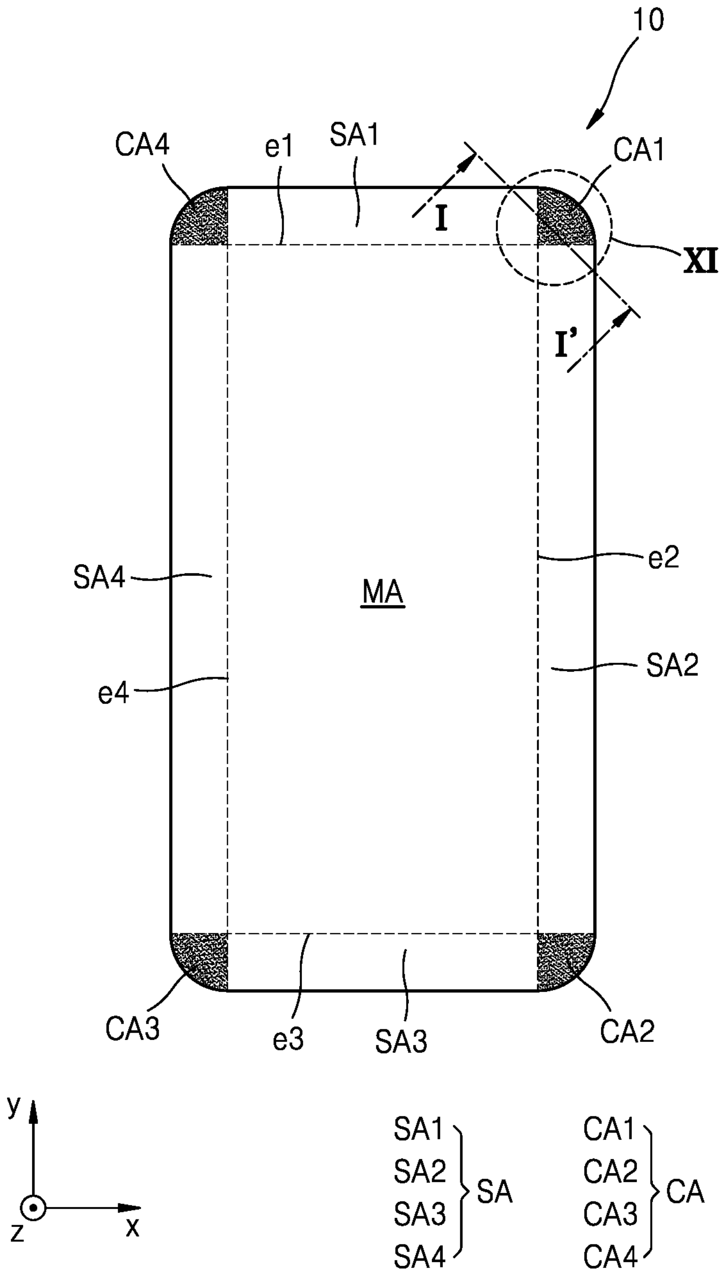
FIG. 1 is a schematic plan view of a protective film according to an embodiment of the disclosure.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or." Throughout the disclosure, the expression "at least one of a, b and c" indicates only a, only b, only c, both a and b, both a and c, both b and c, all of a, b, and c, or variations thereof.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well (and vice versa), unless the context clearly indicates otherwise.

It will be further understood that the terms "comprises", "comprising", "has", "having", "includes", and "including", as used herein, specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. For example, intervening layers, regions, or components may be present.

Sizes of elements in the drawings may be exaggerated for convenience of explanation. For example, since sizes and thicknesses of components in the drawings may be arbitrarily illustrated for convenience of explanation, embodiments of the disclosure are not limited thereto.

When a certain embodiment may be implemented differently, a specific process order may be performed differently from the described order. For example, two consecutively described processes may be performed substantially at the same time or performed in an order opposite to the described order.

It will also be understood that when a layer, region, or component is referred to as being "connected" or "coupled" to another layer, region, or component, it can be directly connected or coupled to the other layer, region, or component or intervening layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. It will be understood that the terms "connected to" or "coupled to" may include a physical or electrical connection or coupling.

In the following examples, the x-axis, the y-axis and the z-axis may not be limited to three axes of the rectangular coordinate system, and may be interpreted in a broader sense. For example, the x-axis, the y-axis, and the z-axis may be perpendicular to one another, or may represent different directions that are not perpendicular to one another.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

Figure 2:
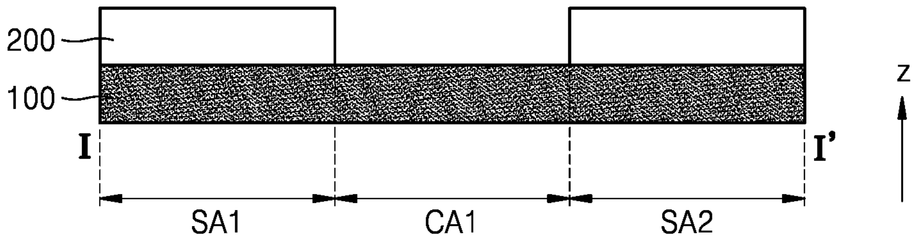
FIG. 2 is a schematic cross-sectional view of a portion of the protective film of FIG. 1 taken along line I-I'.

FIG. 1 is a schematic plan view of a protective film 10 according to an embodiment of the disclosure, and FIG. 2 is a schematic cross-sectional view of a portion of the protective film 10 of FIG. 1 taken along line I-I'.

Referring to FIG. 1, the protective film 10 may include a middle area MA, side areas SA, and corner areas CA.

The middle area MA may correspond to a middle portion of the protective film 10. As shown in FIG. 1, the middle area MA may have a rectangular shape when viewed in a direction perpendicular to the protective film 10 (for example, in a z direction).

The side areas SA may extend from (e.g., be connected to) edges of the middle area MA. The side areas SA may extend from the edges of the middle area MA, respectively. For example, a first side area SA1 may be connected to a first edge e1 of the middle area MA, the second side area SA2 may be connected to a second edge e2 of the middle area MA, the third side area SA3 may be connected to a third edge e3 of the middle area MA, and the fourth side area SA4 may be connected to a fourth edge e4 of the middle area MA. As shown in FIG. 1, the first edge e1 and the second edge e2 may intersect with each other, the first edge e1 and the third edge e3 may be parallel to each other, and the second edge e2 and the fourth edge e4 may be parallel to each other.

The corner areas CA may be located at corners of the protective film 10. The corner areas CA may connect the side areas SA to each other. For example, a first corner area CA1 may connect the first side area SA1 to the second side area SA2, the second corner area CA2 may connect the second side area SA2 to the third side area SA3, the third corner area CA3 may connect the third side area SA3 to the fourth side area SA4, and the fourth corner area CA4 may connect the first side area SA1 to the fourth side area SA4.

According to an embodiment, as shown in FIG. 1, the edges of the corner areas CA may be convex. Each corner area CA may include a curved line of an edge, and straight lines that contact the side areas SA. Each corner area CA may have a fan shape. A planar shape of the protective film 10 may be a rounded rectangle.

Referring to FIG. 2, the protective film 10 may include a first layer 100, and a second layer 200 on the first layer 100. The first layer 100 and the second layer 200 may include at least one of a light absorbing member, a buffering member, a heat dissipation member, and a light-shielding member. For example, the first layer 100 may include a buffering member and a light-shielding member, and the second layer 200 may include a heat dissipation member.

An adhesive may be located between the first layer 100 and the second layer 200. For example, at least one of an optical clear resin (OCR), an optical clear adhesive (OCA), and a pressure sensitive adhesive (PSA) may be located between the first layer 100 and the second layer 200.

According to an embodiment, the second layer 200 may expose at least a portion of the corner areas CA of the first layer 100. For example, as shown in FIG. 2, the second layer 200 may overlap (e.g., cover) the first side area SA1 and the second side area SA2 of the first layer 100, and expose the first corner area CA1 of the first layer 100. The second layer 200 may cover the middle area MA of the first layer 100. The first side area SA1, the second side area SA2, and the first corner area CA1 have been focused on and described above, and this description may be equally applicable to the third side area SA3, the fourth side area SA4, the second corner area CA2, the third corner area CA3, and the fourth corner area CA4.

Figure 14:
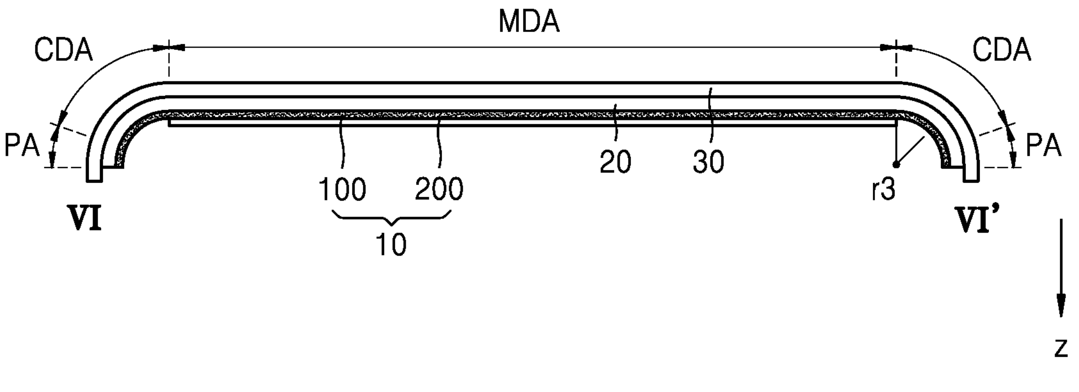
FIG. 14 is a schematic cross-sectional view of a portion of the display apparatus of FIG. 11 taken along line VI-VI'.

As shown in FIG. 14, which will be described later, the protective film 10 may be attached to a rear surface of the display panel 20. The corner areas CA of the protective film 10 may correspond to corner display areas CDA of the display panel 20. The corner display areas CDA of the display panel 20 may be bent with a preset radius of curvature, and the corner areas CA of the protective film 10 under the display panel 20 may also be bent with a preset radius of curvature.

The second layer 200 of the protective film 10 may have a lower elongation property than the first layer 100 of the protective film 10. In case that at least a portion of the second layer 200 having a low elongation property is removed in correspondence with the corner area CA as in an embodiment of the disclosure, the corner areas CA of the protective film 10 may have an improved elongation property. In other words, in case that an external force is applied to the protective film 10, the corner areas CA of the protective film 10 may be readily deformed. As the corner areas CA of the protective film 10 may be readily deformed, wrinkling or the like may not occur in case that the corner areas CA of the protective film 10 are bent with a preset radius of curvature.

Figure 3:
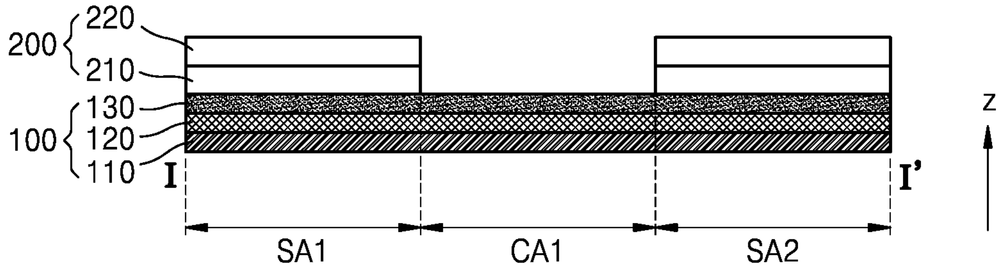
FIG. 3 is a schematic cross-sectional view of a portion of the protective film of FIG. 1 taken along line I-I'.

FIG. 3 is a schematic cross-sectional view of a portion of the protective film 10 of FIG. 1 taken along line I-I'.

Referring to FIG. 3, the first layer 100 may include a first functional layer 110, a second functional layer 120, and a third functional layer 130, and the second layer 200 may include a fourth functional layer 210 and a fifth functional layer 220.

The first functional layer 110 (e.g., a light-shielding layer) may have a light-shielding function. The first functional layer 110 may include at least one of a light-absorbing member for absorbing light incident from an external source and a light-shielding layer for shielding the light incident from the external source.

According to an embodiment, the first functional layer 110 may have a black color. The first functional layer 110 may include at least one of a black pigment, a black dye, and black particles. For example, the first functional layer 110 may include Cr, $CrO_X$, $Cr/CrO_X$, $Cr/CrO_X/CrN_Y$, a resin (e.g., a carbon pigment or an RGB mixed pigment), graphite, a non-Cr-based material, a lactam-based pigment, a perylene-based pigment, or a combination thereof. The first functional layer 110 may include a black organic pigment, and the black organic pigment may include at least one of aniline black, lactam black, and perylene black. In another embodiment, the first functional layer 110 may be formed by coating a material such as carbon or chromium.

Figure 12:
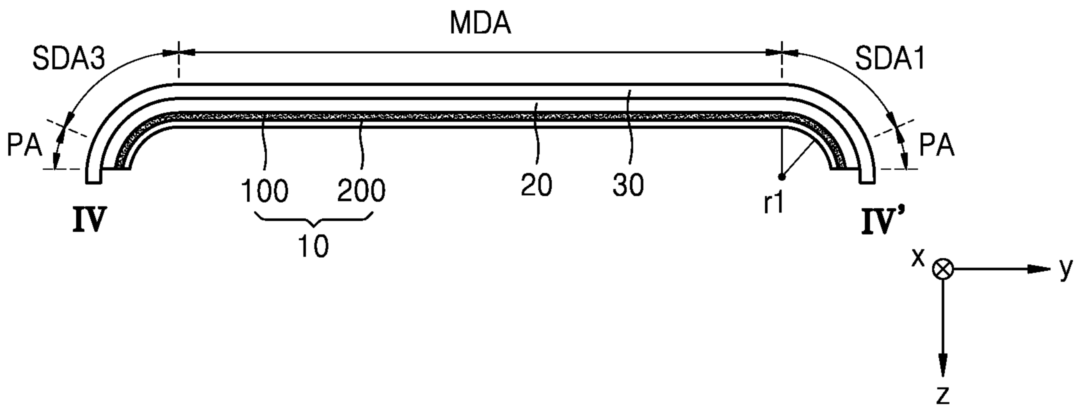
FIG. 12 is a schematic cross-sectional view of a portion of the display apparatus of FIG. 11 taken along line IV-IV'.

The first functional layer 110 may have an adhesion function of attaching the protective film 10 to the rear surface of the display panel 20 (see FIG. 12). The first functional layer 110 may include an embossed adhesive layer. The material of the embossed adhesive layer is not particularly limited, and an adhesive material may be used. For example, various polymer resins may be used as the material of the embossed adhesive layer.

The second functional layer 120 may function as a base film for forming the first functional layer 110. The second functional layer 120 may include silicon or polyethylene terephthalate (PET). In case that the second functional layer 120 includes silicon, the second functional layer 120 may have an increased elongation property.

According to an embodiment, the second functional layer 120 may have a black color. The second functional layer 120 may include at least one of a black pigment, a black dye, and black particles. For example, the second functional layer 120 may include Cr, $CrO_X$, $Cr/CrO_X$, $Cr/CrO_X/CrN_Y$, a resin (e.g., a carbon pigment or an RGB mixed pigment), graphite, a non-Cr-based material, a lactam-based pigment, a perylene-based pigment, or a combination thereof. The second functional layer 120 may include a black organic pigment, and the black organic pigment may include at least one of aniline black, lactam black, and perylene black. In another embodiment, the second functional layer 120 may be formed by coating a material such as carbon or chromium.

The third functional layer 130 (e.g., cushioning layer) may have a cushioning function. The third functional layer 130 may include a buffering member for absorbing an external impact. The buffering member may be a single layer or multiple layers. For example, the buffering member may include copolymer resin such as polyurethane, polycarbonate, polypropylene, polyethylene, or may include an elastic material such as rubber, a urethane-based material, a sponge obtained by foam-molding an acryl-based material, or a combination thereof. The buffering member may be a cushion layer.

The third functional layer 130 may be a synthetic resin foam including a matrix member and pores. The matrix member may include a flexible material. For example, the matrix member may include a synthetic resin. The pores may readily absorb an impact applied to the display panel 20. The pores may be defined as the third functional layer 130 may have a porous structure. Thus, the pores may be dispersed in the matrix member. The pores may allow the third functional layer 130 to be readily transformed. Accordingly, the elasticity of the third functional layer 130 may be improved to improve the impact resistance of the protective film 10.

Although not shown in FIG. 3, an adhesive may be located between the second functional layer 120 and the third functional layer 130. For example, at least one of an optical clear resin (OCR), an optical clear adhesive (OCA), and a pressure sensitive adhesive (PSA) may be located between the second functional layer 120 and the third functional layer 130.

The fourth functional layer 210 may include a synthetic resin film. The fourth functional layer 210 may include a thermosetting resin. The fourth functional layer 210 may include at least one of polyimide-based resin, acrylic resin, methacryl resin, polyisoprene, vinyl-based resin, epoxy-based resin, urethane-based resin, cellulose-based resin, siloxane-based resin, polyamide-based resin, and perylene-based resin.

Although not shown in FIG. 3, an adhesive may be located between the third functional layer 130 and the fourth functional layer 210. For example, at least one of an optical clear resin (OCR), an optical clear adhesive (OCA), and a pressure sensitive adhesive (PSA) may be located between the third functional layer 130 and the fourth functional layer 210.

The fifth functional layer 220 may have a function of shielding electromagnetic interference (EMI) and/or a function of dissipating heat. The fifth functional layer 220 may include a heat dissipation member for efficiently dissipating heat of the display panel 20. For example, the fifth functional layer 220 may include a metal material having high thermal conductivity, such as copper, nickel, ferrite, silver, aluminum, or a combination thereof.

Although not shown in FIG. 3, an adhesive may be located between the fourth functional layer 210 and the fifth functional layer 220. For example, at least one of an optical clear resin (OCR), an optical clear adhesive (OCA), and a pressure sensitive adhesive (PSA) may be located between the fourth functional layer 210 and the fifth functional layer 220.

According to an embodiment, the fourth functional layer 210 and the fifth functional layer 220 may at least partially expose a portion of the third functional layer 130 corresponding to the first corner area CA1, and may cover another portion of the third functional layer 130 corresponding to the first side area SA1 and the second side area SA2. In case that the fourth functional layer 210 and the fifth functional layer 220 both having a low elongation property are at least partially removed in correspondence with the first corner area CA1, the first corner area CA1 of the protective film 10 may have an improved elongation property. In other words, in case that an external force is applied to the protective film 10, the first corner area CA1 of the protective film 10 may be readily deformed. As the first corner area CA1 of the protective film 10 may be readily deformed, wrinkling or the like may not occur in case that the first corner area CA1 of the protective film 10 is bent with a preset radius of curvature. The first corner area CA1 has been focused on and described above, and this description may be equally applicable to the second corner area CA2, the third corner area CA3, and the fourth corner area CA4.

Figure 4:
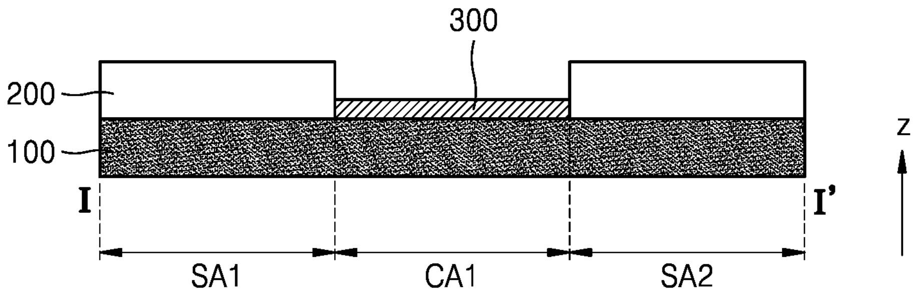
FIG. 4 is a schematic cross-sectional view of a portion of the protective film of FIG. 1 taken along line I-I'.

FIG. 4 is a schematic cross-sectional view of a portion of the protective film 10 of FIG. 1 taken along line I-I'.

Referring to FIG. 4, a third layer 300 may be disposed (e.g., arranged) to cover at least a portion of the first corner area CA1 of the first layer 100 that may be exposed by the second layer 200. The first corner area CA1 has been focused on and described above, and this description may be equally applicable to the second corner area CA2, the third corner area CA3, and the fourth corner area CA4.

The third layer 300 may prevent contamination of the adhesive on the portion of the first layer 100 exposed by the second layer 200. The third layer 300 may include polyethylene terephthalate (PET).

In FIG. 4, the third layer 300 may cover only at least a portion of the first corner area CA1 of the first layer 100 that may be exposed by the second layer 200. However, according to another embodiment, the third layer 300 may be arranged on a front surface of the protective film 10. The third layer 300 may cover the second layer 200 and a portion of the first layer 100.

In FIG. 4, a thickness of the third layer 300 is illustrated as being less than a thickness of the second layer 200. However, according to another embodiment, the thickness of the third layer 300 may be substantially equal to the thickness of the second layer 200.

Figure 5:
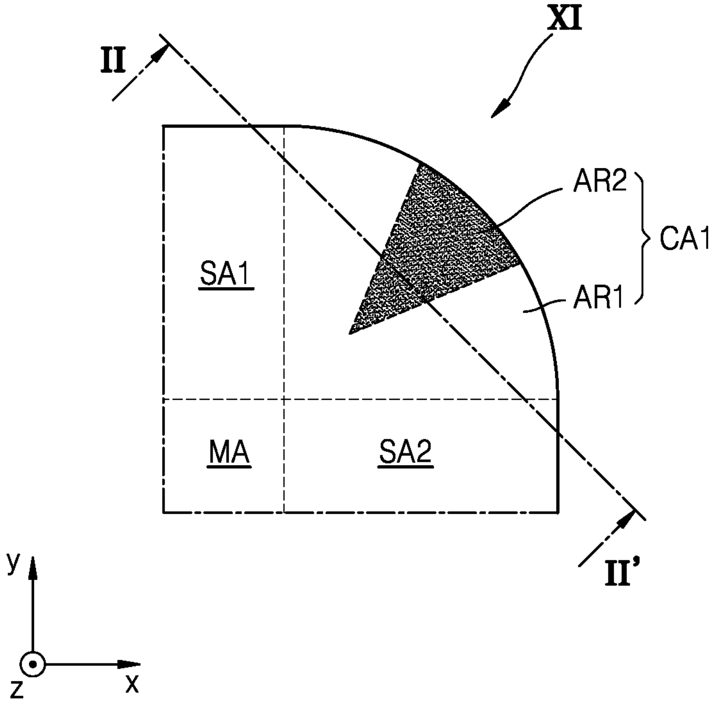
FIG. 5 is a schematic magnified plan view of a portion of a protective film according to an embodiment of the disclosure.
Figure 6:
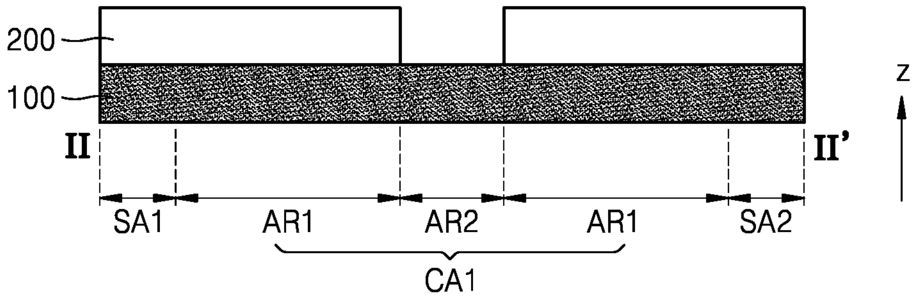
FIG. 6 is a schematic cross-sectional view of a portion of the protective film of FIG. 5 taken along line II-II'.

FIG. 5 is a schematic magnified plan view of a portion of the protective film 10 according to an embodiment of the disclosure, and FIG. 6 is a schematic cross-sectional view of a portion of the protective film 10 of FIG. 5 taken along line II-II'.

Referring to FIGS. 5 and 6, the first corner area CA1 of the protective film 10 of FIG. 1 may include a first area AR1 and a second area AR2. As shown in FIG. 3, the protective film 10 may include the first layer 100, and the second layer 200 on the first layer 100.

According to an embodiment, the second layer 200 may cover the middle area MA, the first side area SA1, and the second side area SA2 of the first layer 100 and the first area AR1 of the first corner area CA1, and may expose the second area AR2 of the first corner area CA1 of the first layer 100.

In case that a portion of the second layer 200 having a lower elongation property than the first layer 100 is removed in correspondence with the second area AR2 of the first corner area CA1, the first corner area CA1 of the protective film 10 may have improved elongation properties and may be readily deformed. Because the first corner area CA1 of the protective film 10 may be readily deformed, wrinkling or the like may not occur in the first corner area CA1 in case that the first corner area CA1 is deformed to have a preset radius of curvature.

According to an embodiment, as shown in FIG. 5, the second area AR2 may be spaced apart from the first side area SA1 and the second side area SA2. The first area AR1 may surround at least a portion of the second area AR2.

In FIGS. 5 and 6, the second area AR2 has a sectoral planar shape. However, according to another embodiment, the planar shape of the second area AR2 may be any of various shapes such as a circle, an oval, a polygon (such as, a quadrangle), a star shape, and a diamond shape.

The first side area SA1, the second side area SA2, and the first corner area CA1 have been focused on and described above, and this description may be equally applicable to the third side area SA3, the fourth side area SA4, the second corner area CA2, the third corner area CA3, and the fourth corner area CA4.

Figure 7:
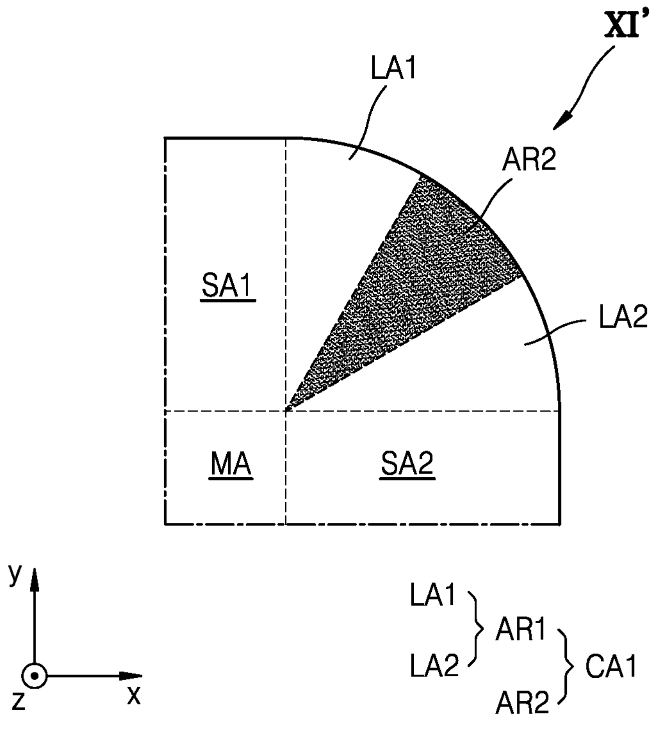
FIG. 7 is a schematic magnified plan view of a portion of a protective film according to an embodiment of the disclosure.

FIG. 7 is a schematic magnified plan view of a portion of the protective film 10 according to an embodiment of the disclosure.

Referring to FIG. 7, the first corner area CA1 of the protective film 10 of FIG. 1 may include a first area AR1 and a second area AR2.

The first area AR1 may include a first line area LA1 and a second line area LA2. The first line area LA1 may be located between the first side area SA1 and the second area AR2, and the second line area LA2 may be located between the second side area SA2 and the second area AR2.

As shown in FIG. 6, the second layer 200 of the protective film 10 may cover the first area AR1 of the first corner area CA1 of the first layer 100 and may expose the second area AR2 of the first corner area CA1 of the first layer 100. The second layer 200 of the protective film 10 may cover the first line area LA1 and the second line area LA2 of the first layer 100.

In case that a portion of the second layer 200 having a lower elongation property than the first layer 100 is removed in correspondence with the second area AR2 of the first corner area CA1, the first corner area CA1 of the protective film 10 may have improved elongation properties and may be readily deformed. Because the first corner area CA1 of the protective film 10 may be readily deformed, wrinkling or the like may not occur in the first corner area CA1 in case that the first corner area CA1 is deformed to have a preset radius of curvature.

The first side area SA1, the second side area SA2, and the first corner area CA1 have been focused on and described above, and this description may be equally applicable to the third side area SA3, the fourth side area SA4, the second corner area CA2, the third corner area CA3, and the fourth corner area CA4.

Figure 8:
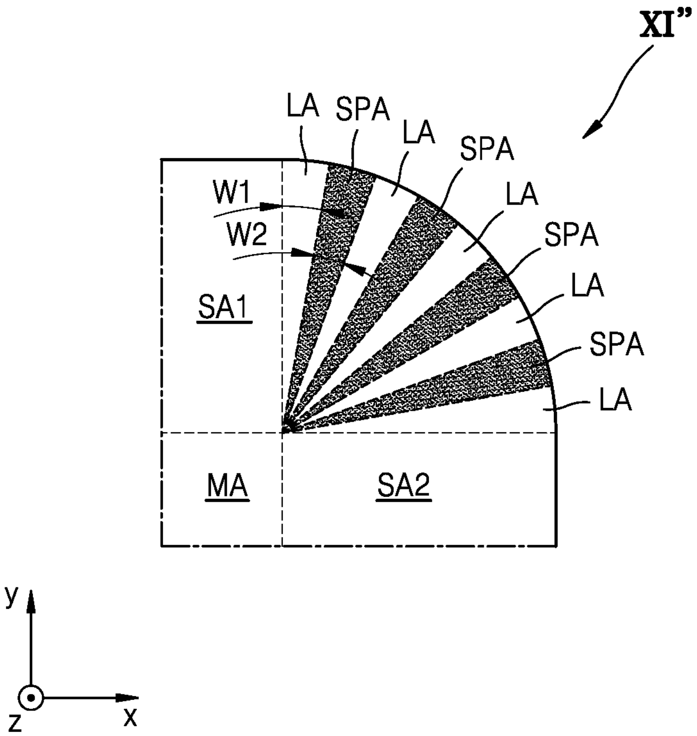
FIG. 8 is a schematic magnified plan view of a portion of a protective film according to an embodiment of the disclosure.

FIG. 8 is a schematic magnified plan view of a portion of the protective film 10 according to an embodiment of the disclosure.

Referring to FIG. 8, the first corner area CA1 of the protective film 10 of FIG. 1 may include the first area AR1 of FIG. 7 and the second area AR2 of FIG. 7.

The first area AR1 may include line areas LA. The line areas LA may each extend in a first direction and may be arranged in a second direction. For example, the first corner area CA1 may have a sectoral planar shape. The first direction may be a radial direction, and the second direction may be a circumferential direction. The line areas LA may each extend in the radial direction and may be arranged in the circumferential direction.

The second area AR2 may include space areas SPA. The space areas SPA may each extend in the first direction and may be arranged in the second direction. For example, the space areas SPA may each extend in the radial direction and may be arranged in the circumferential direction.

According to an embodiment, the line areas LA and the space areas SPA may be arranged alternately in the second direction. For example, as shown in FIG. 8, the line areas LA and the space areas SPA may be arranged alternately in the circumferential direction.

According to an embodiment, a first width W1 of each of the line areas LA in the second direction may gradually increase in the first direction, and a second width W2 of each of the space areas SPA in the second direction may gradually increase in the first direction. For example, as shown in FIG.

8, the first width W1 of each of the line areas LA in the circumferential direction may gradually increase in the radial direction. The second width W2 of each of the space areas SPA in the circumferential direction may gradually increase in the radial direction.

As shown in FIG. 6, the second layer 200 of the protective film 10 may cover the first area AR1 of the first corner area CA1 of the first layer 100 and may expose the second area AR2 of the first corner area CA1 of the first layer 100. The second layer 200 of the protective film 10 may cover the line areas LA of the first layer 100 and may expose the space areas SPA.

In case that a portion of the second layer 200 having a lower elongation property than the first layer 100 is removed in correspondence with the space areas SPA of the first corner area CA1, the first corner area CA1 of the protective film 10 may have improved elongation properties and may be readily deformed. Because the first corner area CA1 of the protective film 10 may be readily deformed, wrinkling or the like may not occur in the first corner area CA1 in case that the first corner area CA1 is deformed to have a preset radius of curvature.

The first side area SA1, the second side area SA2, and the first corner area CA1 have been focused on and described above, and this description may be equally applicable to the third side area SA3, the fourth side area SA4, the second corner area CA2, the third corner area CA3, and the fourth corner area CA4.

Figure 9:
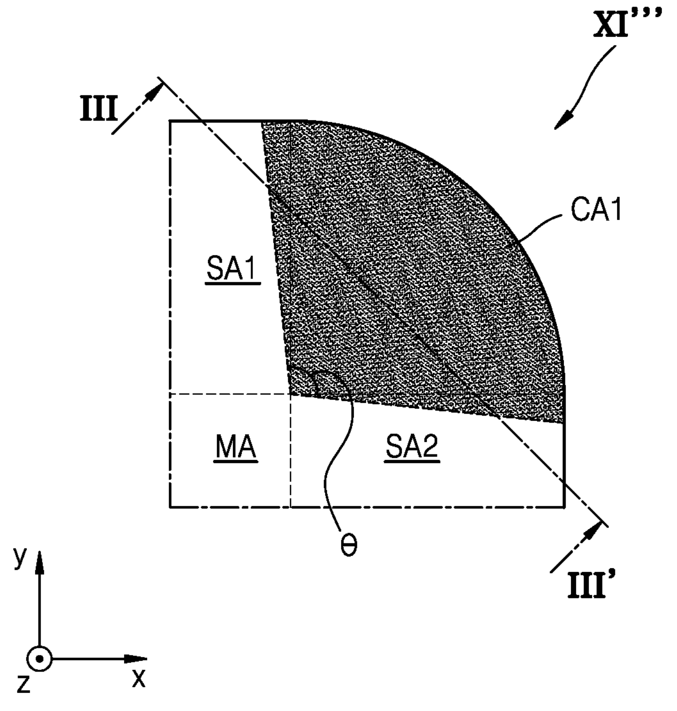
FIG. 9 is a schematic magnified plan view of a portion of a protective film according to an embodiment of the disclosure.
Figure 10:
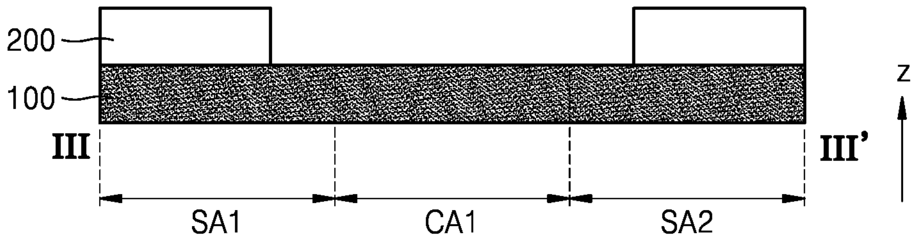
FIG. 10 is a schematic cross-sectional view of a portion of the protective film of FIG. 9 taken along line III-III'.

FIG. 9 is a schematic magnified plan view of a portion of the protective film 10 according to an embodiment of the disclosure, and FIG. 10 is a schematic cross-sectional view of a portion of the protective film 10 of FIG. 9 taken along line III-III'.

Referring to FIGS. 9 and 10, the second layer 200 may expose the corner area CA of the first layer 100, at least a portion of the first side area SA1 of the first layer 100, and at least a portion of the second side area SA2 of the first layer 100. For example, the second layer 200 may expose the corner area CA of the first layer 100, a portion of the first side area SA1 of the first layer 100, and a portion of the second side area SA2 of the first layer 100. The second layer 200 may cover the middle area MA of the first layer 100, another portion of the first side area SA1 of the first layer 100, and another portion of the second side area SA2 of the first layer 100.

According to an embodiment, as shown in FIG. 9, a portion of the first layer 100 exposed by the second layer 200 may have a fan shape. A center angle θ of the portion of the first layer 100 exposed by the second layer 200 may be an obtuse angle.

In FIG. 9, the center angle θ of the portion of the first layer 100 exposed by the second layer 200 is an obtuse angle. However, according to another embodiment, as shown in FIG. 1, the center angle θ of the portion of the first layer 100 exposed by the second layer 200 may be a right angle. According to another embodiment, as shown in FIG. 7, the center angle θ of the portion of the first layer 100 exposed by the second layer 200 may be an acute angle.

The first side area SA1, the second side area SA2, and the first corner area CA1 have been focused on and described above, and this description may be equally applicable to the third side area SA3, the fourth side area SA4, the second corner area CA2, the third corner area CA3, and the fourth corner area CA4.

Figure 11:
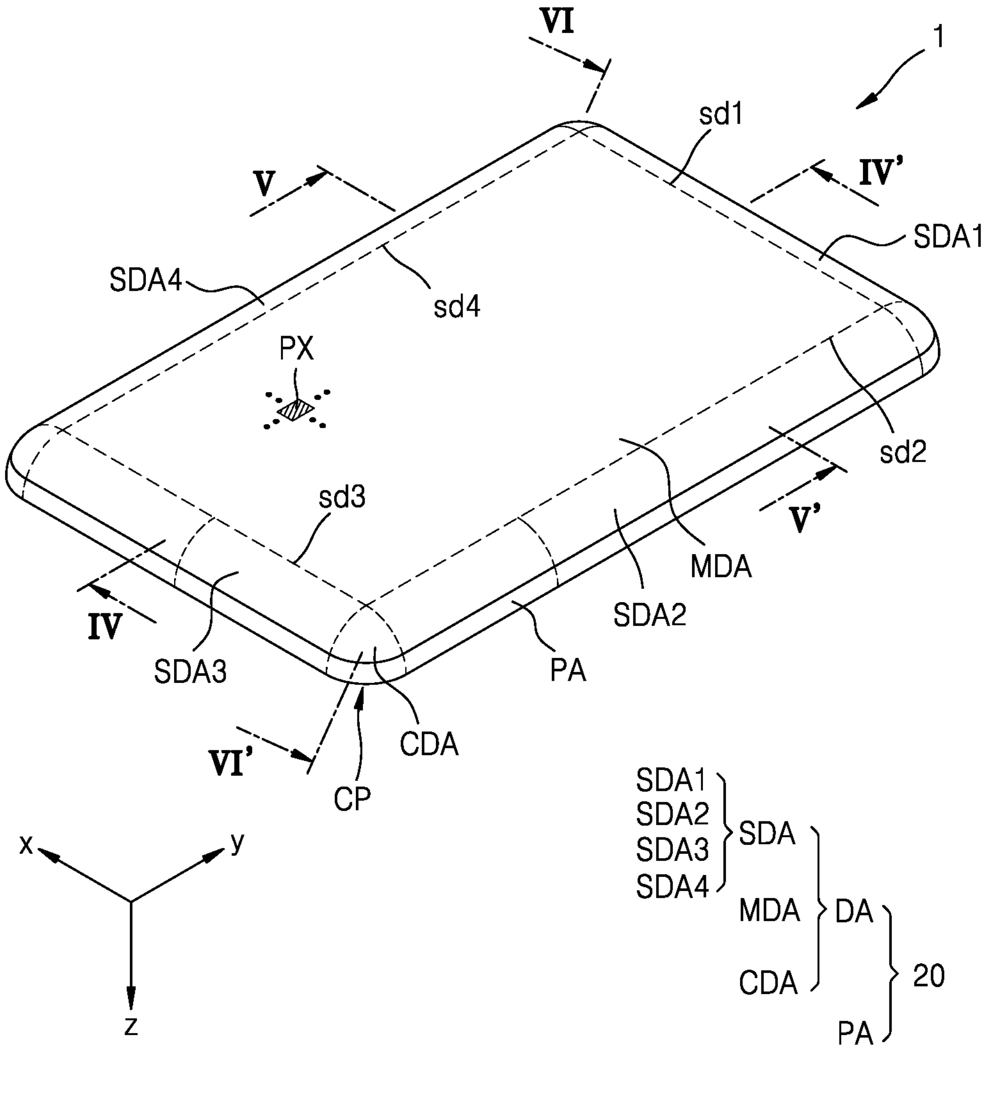
FIG. 11 is a schematic perspective view of a display apparatus according to an embodiment of the disclosure.
Figure 13:
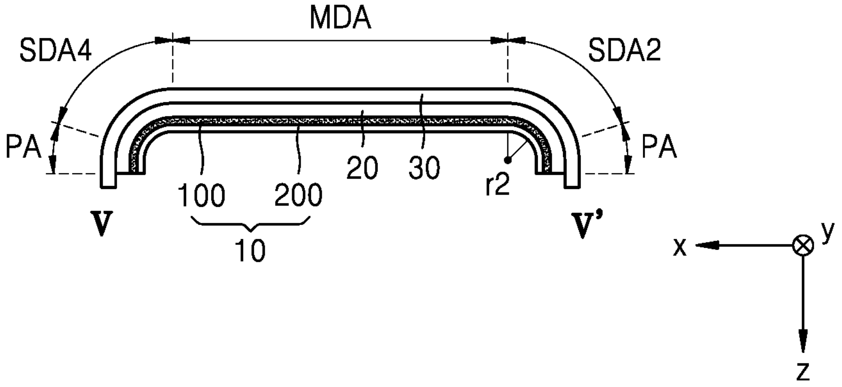
FIG. 13 is a schematic cross-sectional view of a portion of the display apparatus of FIG. 11 taken along line V-V'.

FIG. 11 is a schematic perspective view of a display apparatus 1 according to an embodiment of the disclosure. FIG. 12 is a schematic cross-sectional view of a portion of the display apparatus 1 of FIG. 11 taken along line IV-IV', FIG. 13 is a schematic cross-sectional view of a portion of the display apparatus 1 of FIG. 11 taken along line V-V', and FIG. 14 is a schematic cross-sectional view of a portion of the display apparatus 1 of FIG. 11 taken along line VI-VI'.

Referring to FIG. 11, the display apparatus 1 may display a moving picture or a still image, and thus may be used as a display screen of various products such as not only portable electronic apparatuses, such as mobile phones, smartphones, tablet personal computers (PC), mobile communication terminals, electronic notebooks, electronic books, portable multimedia players (PMP), navigation devices, and ultra mobile PCs (UMPC) but also televisions, notebooks, monitors, advertisement panels, and Internet of things (IoT) devices.

The display apparatus 1 may also be used in wearable devices such as smart watches, watch phones, glasses-type displays, and head mounted displays (HMD). The display apparatus 1 may also be used as a dashboard of an automobile, a center information display (CID) of a center fasciae or dashboard of an automobile, a room mirror display that may replace a side mirror of an automobile, and a display arranged on a rear side of a front seat to serve as an entertainment device for a back seat passenger of an automobile.

The display apparatus 1 may have longer edges in the first direction and shorter edges in the second direction. The first direction and the second direction may intersect with each other. For example, the first direction and the second direction may define an acute angle. As another example, the first direction and the second direction may define an obtuse angle or a right angle. A case where the first direction (for example, a ±y direction) and the second direction (for example, a ±x direction) define a right angle will now be focused on and described in detail.

As another example, the length of an edge of the display apparatus 1 in the first direction (for example, the ±y direction) may be equal to that of an edge of the display apparatus 1 in the second direction (for example, the ±x direction). As another example, the display apparatus 1 may have shorter edges in the first direction (for example, the ±y direction) and longer edges in the second direction (for example, the ±x direction).

Corners between the longer sides in the first direction (±y direction) and the shorter sides in the second direction (±x direction) may be rounded to have a curvature.

Referring to FIGS. 12 through 14, the display apparatus 1 may include the protective film 10, a display panel 20, and a cover window 30. The protective film 10 and the cover window 30 may protect the display panel 20.

The cover window 30 may be a flexible window. The cover window 30 may protect the display panel 20 while being readily bent along an external force without generating cracks and the like. The cover window 30 may include glass, sapphire, plastic, or a combination thereof. For example, the cover window 30 may be tempered glass (e.g., ultra thin glass (UTG®)) or colorless polyimide (CPI). According to an embodiment, the cover window 30 may have a structure in which a flexible polymer layer may be arranged on a surface of a glass substrate, or may include only a polymer layer.

The display panel 20 may be below the cover window 30. Although not shown in FIGS. 12 through 14, the display panel 20 may be attached to the cover window 30 by at least one of an optical clear resin (OCR), an optical clear adhesive (OCA), and a pressure sensitive adhesive (PSA).

The display panel 20 may include a display area DA where an image may be displayed, and a peripheral area PA surrounding the display area DA. The display area DA may include pixels PX, and may display an image through the pixels PX. Each of the pixels PX may include subpixels. For example, each of the pixels PX may include a red subpixel, a green subpixel, and a blue subpixel. In another embodiment, each of the pixels PX may include red, green, blue, and white subpixels.

The display area DA may include a main display area MDA, an auxiliary display area SDA, and a corner display area CDA. Each of the main display area MDA, the auxiliary display area SDA, and the corner display area CDA may include pixels PX, and the pixels PX may display an image.

For example, the pixels PX arranged in each of the main display area MDA, the auxiliary display area SDA, and the corner display area CDA may provide an independent image. For example, the pixels PX arranged in each of the main display area MDA, the auxiliary display area SDA, and the corner display area CDA may provide portions of an image, respectively.

The main display area MDA, which may be a flat display area, may include pixels PX each including a display element. The main display area MDA may provide a majority part of an image.

Pixels PX each including a display element may be also arranged in the auxiliary display area SDA. The auxiliary display area SDA may display an image by using the pixels PX. The auxiliary display area SDA may include a first auxiliary display area SDA1, a second auxiliary display area SDA2, a third auxiliary display area SDA3, and a fourth auxiliary display area SDA4. At least one of the first auxiliary display area SDA1, the second auxiliary display area SDA2, the third auxiliary display area SDA3, and the fourth auxiliary display area SDA4 may be omitted.

The first auxiliary display area SDA1 and the third auxiliary display area SDA3 may be connected to the main display area MDA in the first direction (for example, the ±y direction). For example, the first auxiliary display area SDA1 may extend from the main display area MDA in a +y direction, and the third auxiliary display area SDA3 may extend from the main display area MDA in a −y direction. The first auxiliary display area SDA1 may be connected to a first edge sd1 of the main display area MDA, and the third auxiliary display area SDA3 may be connected to a third edge sd3 of the main display area MDA. Similarly, second and fourth auxiliary display areas SDA2, SDA4 may be connected to second and fourth edges sd2, sd4 of the main display area MDA.

The first auxiliary display area SDA1 and the third auxiliary display area SDA3 may have arbitrary radii of curvature and may be bent. For example, the first auxiliary display area SDA1 and the third auxiliary display area SDA3 may have different radii of curvature. As another example, the first auxiliary display area SDA1 and the third auxiliary display area SDA3 may have the same radii of curvature. A case where each of the first auxiliary display area SDA1 and the third auxiliary display area SDA3 may have the same radius of curvature, namely, a first radius of curvature r1, will now be described in detail. Because the first auxiliary display area SDA1 and the third auxiliary display area SDA3 may be the same as or similar to each other, the first auxiliary display area SDA1 will now be focused on and described in detail.

The second auxiliary display area SDA2 and the fourth auxiliary display area SDA4 may be connected to the main display area MDA in the second direction (for example, the ±x direction). For example, the second auxiliary display area SDA2 may extend from the main display area MDA in a +x direction, and the fourth auxiliary display area SDA4 may extend from the main display area MDA in a −x direction.

The second auxiliary display area SDA2 and the fourth auxiliary display area SDA4 may have arbitrary radii of curvature and may be bent. For example, the second auxiliary display area SDA2 and the fourth auxiliary display area SDA4 may have different radii of curvature. As another example, the second auxiliary display area SDA2 and the fourth auxiliary display area SDA4 may have the same radii of curvature. A case where each of the second auxiliary display area SDA2 and the fourth auxiliary display area SDA4 may have the same radius of curvature, namely, a second radius of curvature r2, will now be focused on and described in detail. Because the second auxiliary display area SDA2 and the fourth auxiliary display area SDA4 may be the same as or similar to each other, the second auxiliary display area SDA2 will now be focused on and described in detail.

According to an embodiment, the first radius of curvature r1 of the first auxiliary display area SDA1 may be different from the second radius of curvature r2 of the second auxiliary display area SDA2. For example, the first radius of curvature r1 may be less than the second radius of curvature r2. As another example, the first radius of curvature r1 may be greater than the second radius of curvature r2.

According to another embodiment, the first radius of curvature r1 of the first auxiliary display area SDA1 may be the same as the second radius of curvature r2 of the second auxiliary display area SDA2. A case where the first radius of curvature r1 may be greater than the second radius of curvature r2 will now be focused on and described in detail.

The corner display area CDA may extend from each of the corners of the main display area MDA and may be bent. The corner display areas CDA may be arranged to correspond to corner portions CP. The corner portions CP, which may be the corners of the display area DA, may be portions of the display area DA where the longer edges of the display area DA in the first direction (for example, the ±y direction) and the shorter edges thereof in the second direction (for example, the ±x direction) meet each other.

The corner display areas CDA may be between adjacent auxiliary display areas SDA. For example, a corner display area CDA may be between the first auxiliary display area SDA1 and the second auxiliary display area SDA2. A corner display area CDA may be between the second auxiliary display area SDA2 and the third auxiliary display area SDA3, between the third auxiliary display area SDA3 and the fourth auxiliary display area SDA4, or between the fourth auxiliary display area SDA4 and the first auxiliary display area SDA1. Accordingly, the auxiliary display area SDA and the corner display areas CDA may be arranged to surround the main display area MDA, and may each have an arbitrary radius of curvature and may be bent.

A third radius of curvature r3 of the corner display area CDA may be provided in plurality. The corner display area CDA may have multiple third radii of curvature r3. In other words, the third radius of curvature r3 of the corner display area CDA may vary. For example, the third radii of curvature r3 of the corner display area CDA may correspond to arbitrary radii of curvature within a vector sum (r1+r2) of the first radius of curvature r1 of the first auxiliary display area SDA1 and the second radius of curvature r2 of the second auxiliary display area SDA2, respectively. In other words, the third radius of curvature r3 may vary within the vector sum (r1+r2) of the first radius of curvature r1 and the second radius of curvature r2.

According to an embodiment, the display apparatus 1 may display an image not only in the main display area MDA but also in the auxiliary display area SDA and the corner display areas CDA. Accordingly, occupancy of the display area DA in the display apparatus 1 may increase. Because the display apparatus 1 may be bent at its corners and may include the corner display areas CDA displaying an image, a sense of aesthetic satisfaction may be improved.

Figure 15:
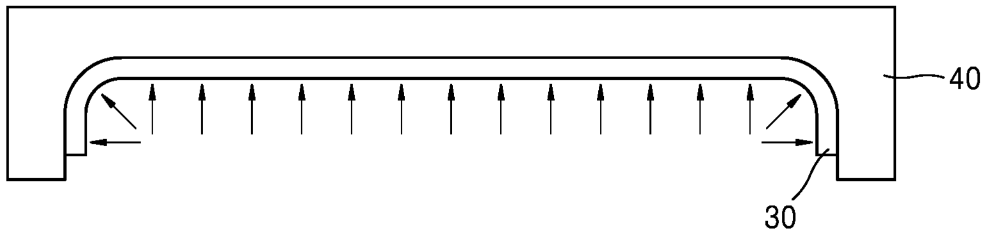
FIGS. 15 through 19 are schematic cross-sectional views schematically illustrating a method of manufacturing a display apparatus, according to an embodiment of the disclosure.
Figure 16:
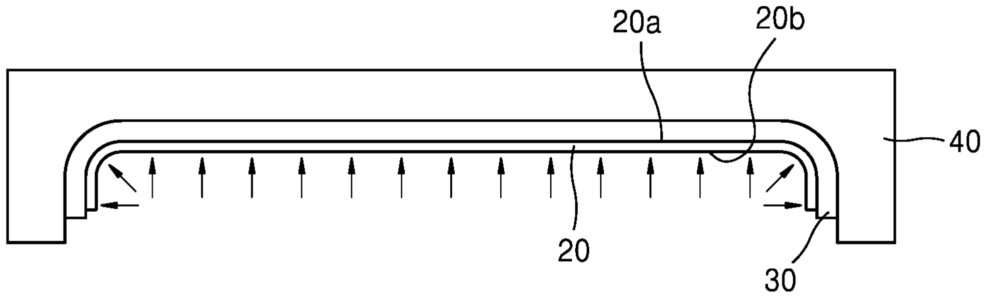
Figure 17:
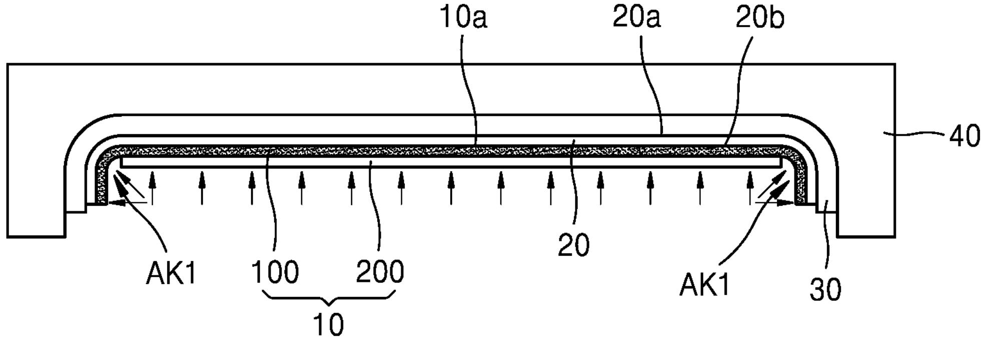

As shown in FIGS. 15 through 17, which will be described later, the display apparatus 1 may be manufactured by sequentially attaching the display panel 20 and the protective film 10 to the cover window 30 bent with a preset radius of curvature. Accordingly, the above description of the display panel 20 being bent with the first radius of curvature r1, the second radius of curvature r2, and the third radius of curvature r3 may be equally applicable to the cover window 30 and the protective film 10.

The protective film 10 may be located below the display panel 20. The protective film 10 may be located on the rear surface (e.g., a +z direction) of the display panel 20. The protective film 10 may have at least one of the structures shown in FIGS. 1 through 10. The protective film 10 may include the first layer 100 and the second layer 200, and may be attached to a lower surface of the display panel 20 via the first layer 100 including an adhesive layer.

According to an embodiment, as shown in FIG. 14, the second layer 200 of the protective film 10 may at least partially expose a portion of the first layer 100 of the protective film 10 corresponding to the corner display area CDA of the display panel 20. A portion of the protective film 10 corresponding to the corner display area CDA of the display panel 20 may correspond to the corner area CA of the protective film 10 of FIG. 1. The second layer 200 may expose at least a portion of the corner areas CA of the first layer 100.

As such, in case that at least a portion of the second layer 200 having a lower elongation property than the first layer 100 is removed in correspondence with the corner areas CA, the corner areas CA of the protective film 10 may have improved elongation properties and may be readily deformed. Because the corner areas CA of the protective film 10 may be readily deformed, wrinkling or the like may not occur in the corner areas CA in case that the corner areas CA are deformed to have a preset radius of curvature (e.g., the third radius of curvature r3).

FIGS. 15 through 19 are schematic cross-sectional views schematically illustrating a method of manufacturing a display apparatus, according to an embodiment of the disclosure.

First, referring to FIG. 15, the cover window 30 may be prepared. The preparing of the cover window 30 may be an operation of curving the cover window 30 by using a jig 40 including a curved portion. The jig 40 may correspond to a frame including the shape of a display apparatus desired to be finally manufactured. The cover window 30 may be deformed according to an inside shape of the jig 40 by closely adhering the cover window 30 within the jig 40.

Referring to FIG. 16, a first surface 20*a* of the display panel 20 may face the cover window 30, and the cover window 30 and the display panel 20 may be coupled with each other. A transparent adhesive member such as an OCA film may be located between the cover window 30 and the display panel 20.

Referring to FIG. 17, a first surface 10*a* of the protective film 10 may face a second surface 20*b* of the display panel 20, and the display panel 20 and the protective film 10 may be coupled with each other. The second surface 20*b* of the display panel 20 may be opposite to the first surface 20*a* of the display panel 20.

According to an embodiment, in case that the protective film 10 and the display panel 20 are arranged, at least a portion of the first layer 100 exposed by the second layer 200 may be used as a first alignment mark AK1. The first layer 100 and the second layer 200 may include different materials and thus have different colors. At least a portion of the first layer 100 exposed by the second layer 200 may have a different color from the second layer 200. For example, the first layer 100 may include a black material or may include a functional layer coated with a black material, and the at least a portion of the first layer 100 exposed by the second layer 200 may have a black color. Because the at least a portion of the first layer 100 exposed by the second layer 200 may correspond to the corner area CA of FIG. 1 of the protective film 10, the corner area CA of the protective film 10 may be distinguished from the other areas by having a different color therefrom. Even in case that a special alignment mark is not displayed on the protective film 10, the protective film 10 and the display panel 20 may be arranged by using the corner areas CA of the protective film 10 as the first alignment mark AK1.

Figure 18:
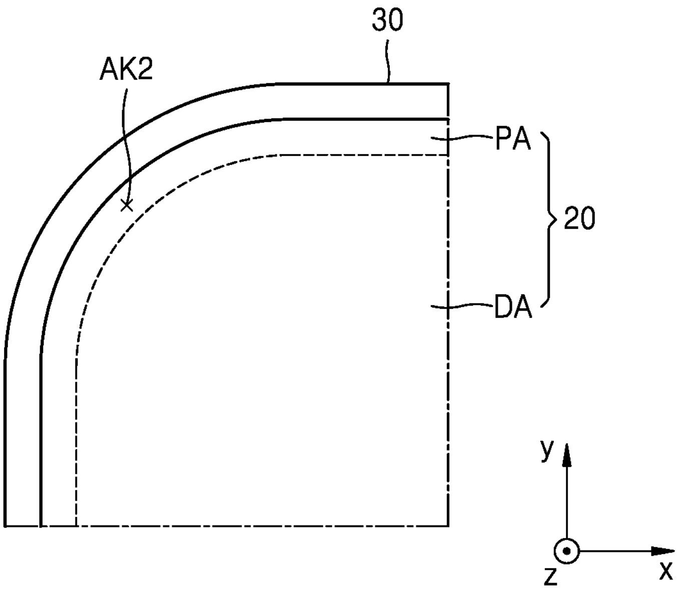

According to an embodiment, as shown in FIG. 18, a second alignment mark AK2 may be displayed on each corner of the display panel 20. The second alignment mark AK2 may be displayed in the peripheral area PA of the display panel 20. The protective film 10 and the display panel 20 may be arranged by using the first alignment mark AK1 of FIG. 17 and the second alignment mark AK2 of FIG. 18. In other words, the protective film 10 and the display panel 20 may be arranged by using at least a portion (e.g., the first alignment mark AK1) of each corner area CA exposed by the second layer 200 and an alignment mark (e.g., the second alignment mark AK2) displayed at each corner of the display panel 20.

Figure 19:
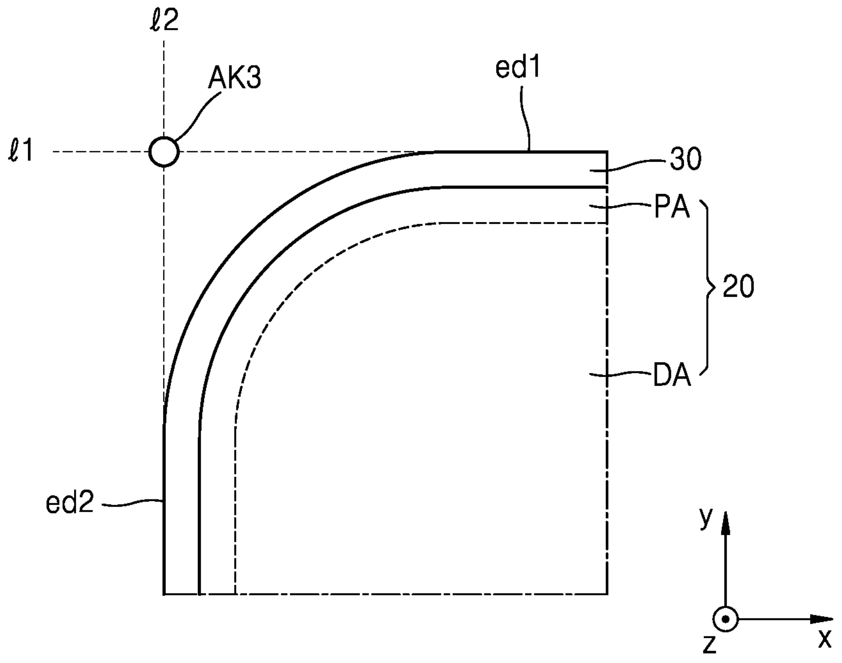

According to an embodiment, as shown in FIG. 19, a point where a virtual first line ℓ1 extending in a lengthwise direction of a first edge ed1 of the cover window 30 meets with a virtual second line ℓ2 extending in a lengthwise direction of a second edge ed2 of the cover window 30 may be used as a third alignment mark AK3. The protective film 10 and the display panel 20 may be arranged by using the first alignment mark AK1 of FIG. 17 and the third alignment mark AK3 of FIG. 19.

Figure 20:
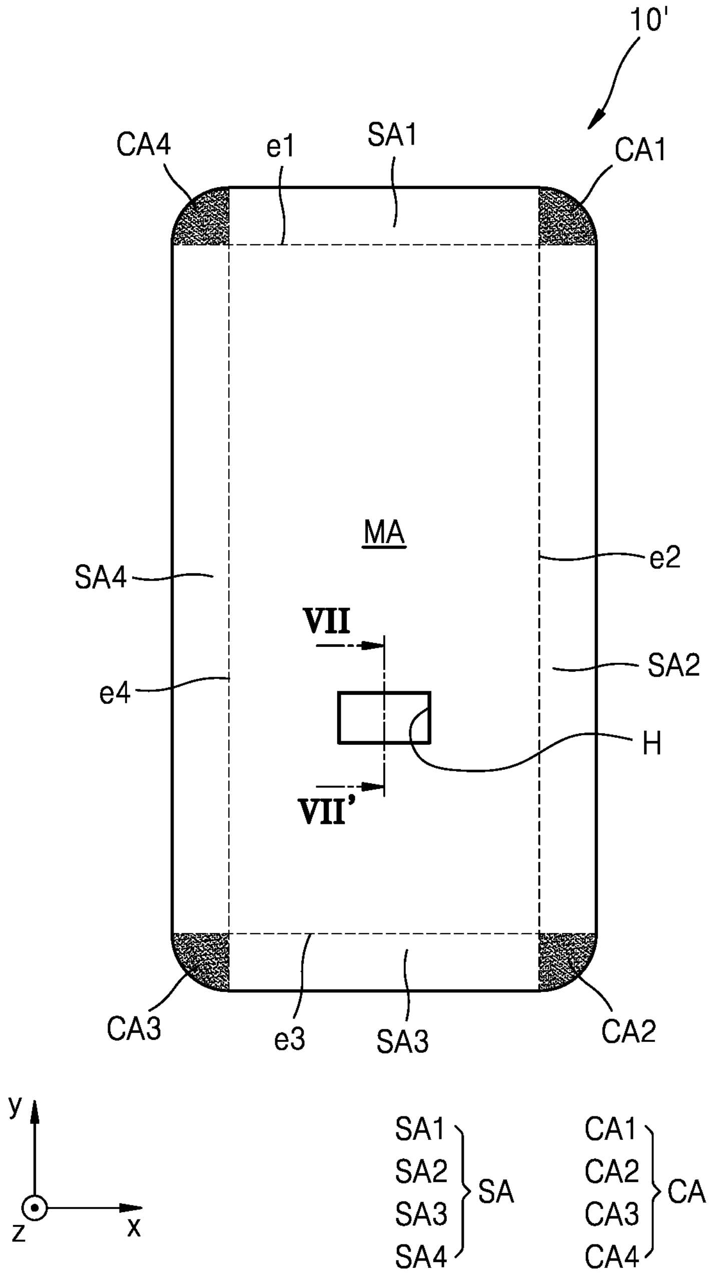
FIG. 20 is a schematic plan view of a protective film according to an embodiment of the disclosure.
Figure 21:
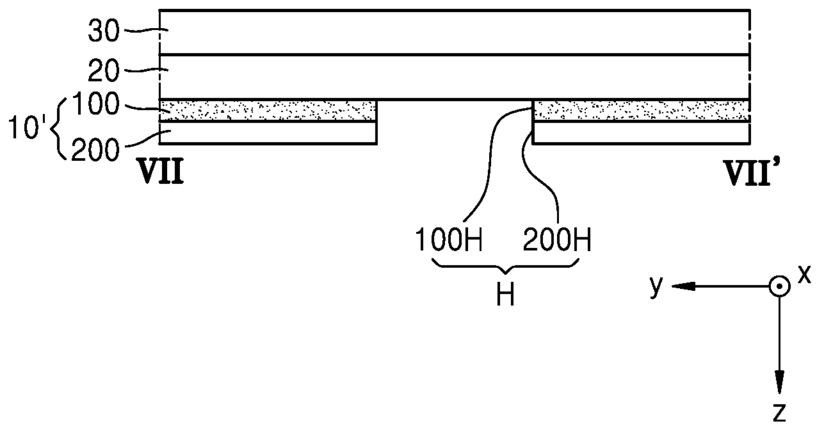
FIG. 21 is a schematic cross-sectional view of a portion of the protective film of FIG. 20 taken along line VII-VII'.

FIG. 20 is a schematic plan view of a protective film 10' according to an embodiment of the disclosure. FIG. 20 is a modification of FIG. 1, and may be different therefrom at least in the structure of a middle area. Hereinafter, some duplicative contents between FIG. 20 and FIG. 1 may be omitted and reference may be made to the description of FIG. 1. FIG. 21 is a schematic cross-sectional view of a portion of the protective film 10' of FIG. 20 taken along line VII-VII'. FIG. 21 illustrates the display panel 20 and the cover window 30 arranged on the protective film 10'.

Referring to FIG. 20, the protective film 10' may include a hole H located in the middle area MA. The hole H may have a closed curve shape.

In FIG. 20, the hole H has a planar quadrangular shape. However, according to another embodiment, the hole H may have any of various other planar shapes such as a circle, an oval, and a polygon.

Referring to FIG. 21, the display panel 20 and the cover window 30 may be sequentially arranged on the protective film 10'. The protective film 10' may include a first layer 100 and a second layer 200 sequentially arranged below the display panel 20.

According to an embodiment, the first layer 100 may have a first hole 100H exposing a portion of the display panel 20, and the second layer 200 may have a second hole 200H corresponding to the first hole 100H. The first hole 100H and the second hole 200H may correspond to the hole H located in the middle area MA. In other words, the hole H located in the middle area MA may include the first hole 100H and the second hole 200H.

A component may be arranged below the protective film 10'. The component may be arranged in correspondence with the hole H of the protective film 10'. The component may be a fingerprint recognition sensor, an illuminance sensor, a proximity sensor, or the like. The hole H of the protective film 10' may minimize limitation of the function of the component.

According to an embodiment as described above, a protective film having an improved elongation property, a display apparatus including the protective film, and a method of manufacturing the display apparatus may be realized. Of course, the scope of the disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims including equivalents thereof.

What is claimed is:

1. A protective film comprising:
- a first layer having: a middle area; a first side area extending from a first edge of the middle area; a second side area extending from a second edge of the middle area intersecting the first edge of the middle area; and a corner area extending from the first side area and the second side area; and
- a second layer disposed on the first layer, absent from the corner area of the first layer, and continuous in the middle area, the first side area and the second side area,
- wherein the second layer comprises a heat dissipation member,
- wherein the first layer entirely fills the corner area.

2. The protective film of claim 1, wherein the second layer overlaps the middle area, the first side area, and the second side area of the first layer, and the second layer exposes the corner area of the first layer.

3. The protective film of claim 1, wherein the corner area comprises a first area and a second area, the second layer overlaps the middle area, the first side area, the second side area, and the first area of the first layer in a plan view, and the second layer exposes the second area of the first layer.

4. The protective film of claim 3, wherein the second area is spaced apart from the first side area and the second side area, and the first area surrounds at least a portion of the second area.

5. The protective film of claim 3, wherein the first area comprises a first line area and a second line area, the first line area is disposed between the first side area and the second area, and the second line area is disposed between the second side area and the second area.

6. The protective film of claim 3, wherein the first area comprises line areas each extending in a first direction and disposed in a second direction, the second area comprises space areas each extending in the first direction and disposed in the second direction, and the line areas and the space areas are disposed alternately in the second direction.

7. The protective film of claim 6, wherein the corner area has a sectoral shape in a plan view, the first direction is a radial direction, and the second direction is a circumferential direction.

8. The protective film of claim 6, wherein a first width of each of the line areas in the second direction increases in the first direction, and a second width of each of the space areas in the second direction increases in the first direction.

9. The protective film of claim 1, wherein the first layer comprises:
- a light shielding layer;
- a cushioning layer; and another layer located between the light shielding layer and the cushioning layer, and the another layer comprises silicon or polyethylene terephthalate (PET).

10. The protective film of claim 1, further comprising:
- a third layer overlapping the at least a portion of the corner area exposed by the second layer in a plan view.

11. The protective film of claim 1, wherein the heat dissipating member comprises a metal material.

12. The protective film of claim 1, wherein the second layer is configured to expose an entirety of the corner area of the first layer.

13. A protective film comprising:
- a first layer having: a middle area; a first side area extending from a first edge of the middle area; a second side area extending from a second edge of the middle area intersecting the first edge of the middle area; and a corner area extending from the first side area and the second side area; and
- a second layer disposed on the first layer absent from the corner area of the first layer, and continuous in the middle area, the first side area and the second side area,
- wherein the first layer comprises: a light shielding layer; a cushioning layer; and a base film located between the light shielding layer and the cushioning layer,
- wherein the first layer entirely fills the corner area.

14. The protective film of claim 13, wherein the base film comprises silicon or polyethylene terephthalate (PET).

15. The protective film of claim 13, wherein the second layer comprises a heat dissipation member.

16. The protective film of claim 15, wherein the heat dissipating member comprises a metal material.

17. The protective film of claim 13, wherein the second layer is configured to expose an entirety of the corner area of the first layer.

18. An electronic device comprising:
- a display panel; and
- protective film attached to a rear surface of the display panel, the protective film comprising:
  - a first layer having: a middle area; a first side area extending from a first edge of the middle area; a second side area extending from a second edge of the middle area intersecting the first edge of the middle area; and a corner area extending from the first side area and the second side area; and a second layer disposed on the first layer absent from the corner area of the first layer, and continuous in the middle area, the first side area and the second side area.

19. The electronic device of claim 18, wherein the first layer entirely fills the corner area.

20. The electronic device of claim 18, wherein the second layer comprises a heat dissipation member.

* * * * *